Feb. 17, 1970 R. B. GREENLY 3,496,543
ON-LINE READ/COPY DATA PROCESSING SYSTEM ACCEPTING
PRINTED AND GRAPHIC MATERIAL
Filed Jan. 27, 1967
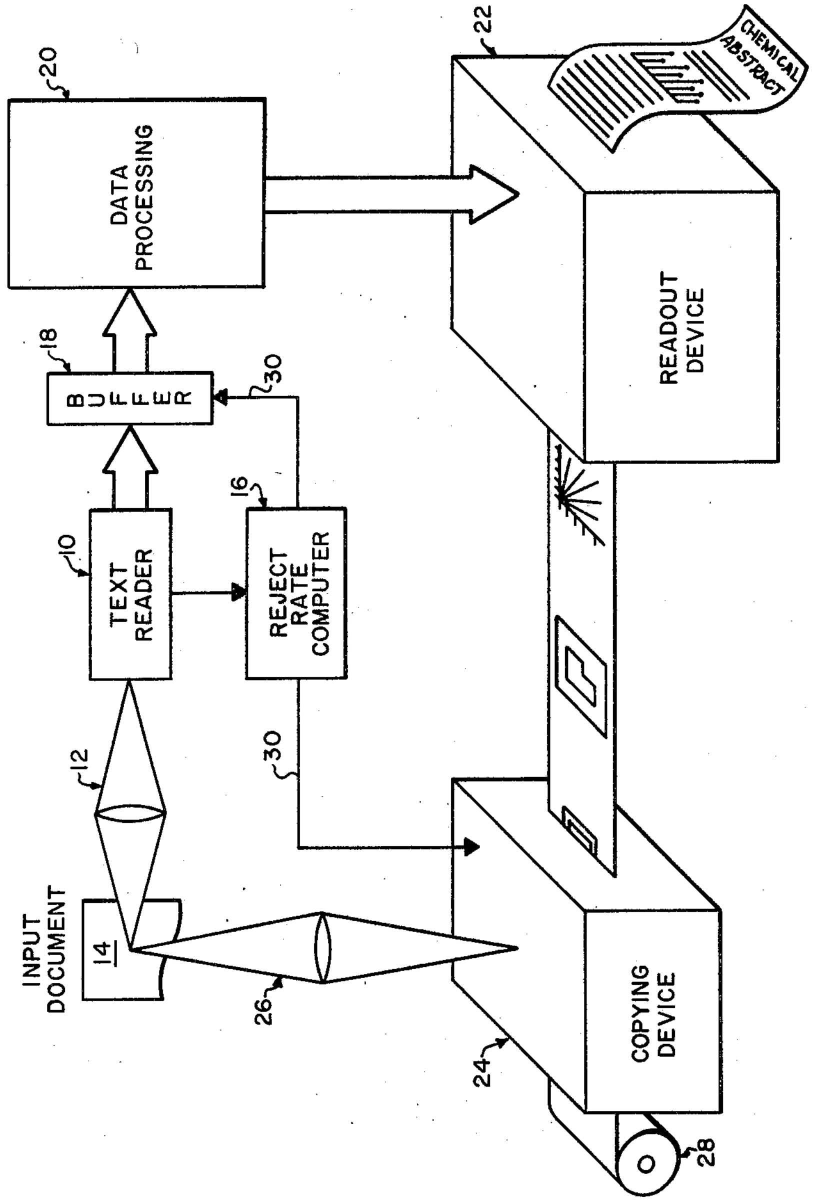
INVENTOR.
ROBERT B. GREENLY
BY
ATTORNEY United States Patent Office 3,496,543

Patented Feb. 17, 1970

3,496,543

ON-LINE READ/COPY DATA PROCESSING SYSTEM ACCEPTING PRINTED AND GRAPHIC MATERIAL

Robert B. Greenly, Binghamton, N.Y., assignor to Singer-General Precision, Inc., a corporation of Delaware Filed Jan. 27, 1967, Ser. No. 612,207
Int. Cl. G06k *9/02*
U.S. Cl. 340—146.3 5 Claims

ABSTRACT OF THE DISCLOSURE

A data processing system which includes a character recognition device and a graphic copying device both of which are arranged to view simultaneously the same input document. The character recognition device output normally is fed to a data processor and thence to a readout device. Character recognition logic is included in the system and arranged to disable the readout device and enable the copying device when the character recognition device encounters input material, such as illustrations or graphs, which is incapable of recognizing. Thus, the unrecognized matter is copied and passes through the readout device in its original form collated with the printed matter passed through the data processor.

Background of the invention

This invention relates to automatic reading apparatus, and more particularly, to automatic on-line copying of graphic and other material which is unrecognizable to reading apparatus.

A number of applications for which automatic character recognition machines have been proposed, including, as examples, language translation, text revision, and automated abstract preparation, involve printed pages which may contain graphic material which is unrecognizable to the reading machine due to the necessary limitations on the size of machine vocabulary. For example, a typical reading machine capable of recognizing several fonts of alphabets, ordinarily will be quite incapable of recognizing chemical structure diagrams, various mathematical symbols, charts, drawings, photographs and like material. While pages containing such graphic material may be accommodated in present machinery by manual pre-processing, such as by masking such material, or flagging it with special marginal indicators, then processing the flagged special material off-line, using photographic or other copying techniques, the requirement for such manual pre-processing is clearly undesirable.

Summary of the invention

The present invention provides apparatus which eliminates any need for off-line extraction, masking, flagging or other handling of such special material not programed in the machine vocabulary. In accordance with the invention, reading apparatus connected to work in conjunction with copying apparatus is made switchable between a reading mode and a copying mode in accordance with the reject rate of the character recognition logic. When a reading machine cannot identify a character and so indicates in some manner, it is said to reject the character. The reject rate is usually expressed as a percentage of characters presented. The reading portion of the apparatus operates in conventional manner until a predetermined reject rate threshold is exceeded in a given line scan, for example, or in any predetermined amount of copy. When the threshold is exceeded, the copying machine portion of the apparatus is enabled, and readout from the reading machine portion is inhibited. During the copy mode character-by-character and line-by-line scanning and reading continue, in order to provide a continuing reject rate signal, and only readout from the reading machine is disabled. Then, as copying of the unrecognizable material terminates and the scanner begins again to encounter ordinary text, the dropping of the reject rate below the threshold shuts off the copying machine and allows normal readout from the character reading machine portion.

Brief description of the drawing

The single figure of drawing shows, in schematic form, an exemplary embodiment of a data processing system as contemplated by the invention.

Description of preferred embodiment

Before proceeding with a more detailed description of the invention, it is here noted that the various individual components and subassemblies which are comprised by the system are in and of themselves known in the art. Accordingly they are shown in the drawing in diagrammatic form only and are hereinafter described principally by reference to the respective functions which they perform.

Referring then to the drawing, the basic component of the system is a character recognition device or text reader 10 which includes an optical scanning or viewing system 12 by means of which an image of the input document 14 is conveyed to the text reader.

Typically, text reader 10 includes a memory system or vocabulary which has stored therein in some suitable form (e.g., in binary code) each individual character which is to be recognized by the reader. In a comparatively simple device this vocabulary may include the upper and lower case letters of an alphabet of a single font. As the reader scans the input material, it generates a signal for each individual character which is compared with each of the coded characters contained in the memory, the identity of the characters scanned being established by matching with the corresponding character in the vocabulary.

In a particular form of text reader, disclosed in U.S. Patent No. 3,290,651, a reading head is provided which consists of a row of photocells which are scanned sequentially to produce digitized pulse trains characteristic of the individual characters as the characters themselves or character images pass under the reading head. Reference pulse trains indicative of the various characters expected to be encountered are stored in a magnetic drum memory or diode matrices. The character being scanned at any given instant is compared with the various characters in the memory and error pulses are tallied relative to each of the characters in the memory. At the end of the pulse train of each character being read, the net error tally in each character channel is interrogated and the channel having the least error thereby identified so that the output signal from the channel may actuate an appropriate readout device.

In order to prevent erroneous "recognition" of characters other than those contained in the reader memory, an error count threshold is provided. In the character recognition device of U.S. Patent No. 3,290,651, when all stored characters differ by more than the preset threshold amount, it no longer selects the most likely characters but indicates a misread or reject and either stops the machine and signals the operator who may visually identify the character or provides a suitable output pulse signalling each reject and suitable for causing an accumulation of total rejects or reject rate computation (reject rate computer).

In the present invention the device for making the reject tally and decision as to whether or not the reject rate is excessive is shown at 16 and designated as a reject rate computer. In the normal course of operation, i.e., when the text reader encounters recognizable input data, the output signals representative of the characters being scanned is passed through a buffer 18 to a data processing device 20 which operates on the signal in a predetermined manner. The data processing device may perform any of a variety of modifications on the incoming data such as, for example, language translation, text revision, automatic abstract preparation, etc.

The output of data processing device 20 is fed to a suitable readout device 22 which may be any type of apparatus capable of accepting the output of the data processor and recording such data in a useable form on a selected medium. This recording may be accomplished electronically or by use of an electrostatic, photographic or electromechanical printer. The particular readout device selected depends in part on the form of copying apparatus which is employed and, therefore, further discussion of the readout device will be deferred pending description of such apparatus.

Referring once again to the drawing, the system contemplated by the invention includes a duplicating or copying apparatus 24 which includes an optical system 26 for viewing input document 14 and transmitting an image thereof to the copying apparatus proper. While an optical system is shown and has been described, it will be appreciated that, in some forms of reproduction equipment, copying is performed by direct contact of the input document with the medium on which the reproduction apparatus 24 are disposed relative to one another and to input document 14 in such a manner that the document can be simultaneously scanned or viewed by both devices. In the illustrated embodiment the copying apparatus may, for the sake of specific example, be considered as of the xerographic or electrostatic type and includes a supply of paper 28 or other suitable medium. The paper supply is fed from a roll and passes through the copier and then through readout device 22 as shown in the drawing.

As shown by arrow 30, the signals of reject computer 16, which indicate whether or not a preset reject rate is exceeded, as coupled to buffer 18 and copying apparatus 24 to achieve a normal mode of operation in which readout device 22 is operative and copying device 24 inoperative. This condition obtains for so long as the input data scanned by text reader 10 is recognizable. When the reader encounters a predetermined proportion of unrecognizable characters, reject rate computer 16 disables readout from the text reader 10 by inhibiting buffer 18 and enables copying device 24.

It will be noted that, while the system is in the copy mode, the data processing device 20 is inoperative but not so reader 10. The reader continues scanning the input data and, when it again encounters recognizable characters, the reject rate falls below the threshold level switching the system back to the read mode.

Most existing reading machines have an output representing unrecognizable characters or "rejects." This output can be used to feed the reject rate monitoring logic 16 directly and this logic could consist of nothing more than a preset digital counter, which is well known in the art. A preferred method for instrumenting the reject rate monitoring logic, however, would be to include the number of characters scanned in the actual computation of reject rate. For example, if 100 character intervals were detected in a given line of which more than about 75 were rejected by the reader, the reject rate monitoring logic would be made to solve the computation 75/100=75% reject rate. And, if 10 character intervals were detected, of which 7 indicated as rejects, a 70% reject rate would result. In both cases, the copy mode would be enabled and the readout from the reader inhibited.

In the illustrated embodiment, and in all preferred forms of the invention, copying device 24, readout device 22, text reader 10 and data processing device 20 are selected with due regard for their respective speeds of operation to permit an arragement in which automatic collation is achieved, as this would permit the paper supply to be driven synchronously with the input document line scanning rate. With such an arrangement the physical locations at which copying and output text recording takes place should be as close together as possible to minimize or eliminate the need for storing or detecting areas within which copying takes place or clear areas where recording is permitted.

An electrostatic copying apparatus such as the Xerox 914 copier has a copying speed of about 9 typewritten lines per second which equals or exceeds most of the fast print readers currently available. Where the input material includes photographs or other half-tone illustrations, and higher graphic arts quality of the reproduction is desired than can be achieved with an electrostatic process, a photographic copying device may be employed. The output recorder most compatible with photographic copying would be an electronic character generator which would permit recording of text on the same film medium as used for copying. High speed, high resolution character generation systems utilizing a cathode ray tube display are known in the art.

The embodiment of the invention in which an exclusive property or privilege is claimed are defined as follows:

1. A data processing system comprising, in combination:

reading means operable to sense input data recorded in at least one preselected form, recognizable by the reading means, and to generate output signals representative of the intelligence conveyed by the data in said preselected form;

data processing means normally receiving said output signals and operating thereon in a predetermined manner to generate output data signals conveying said intelligence in modified form;

readout means normally receiving the output data signals and recording such signals in a useable form on a selected medium;

graphic copying means viewing said data simultaneously with said reading means and operable to record images thereof on said selected medium; and automatic control means operative in response to scanning by said reading means of input data which is not in said recognizable form, to disable temporarily the output of said reading means and simultaneously enable said copying means.

2. A data processing system according to claim 1 wherein said control means is a reject rate computer, monitoring the rate at which the reading means encounters data in unrecognizable form and operating to enable the copying means and disable the output of the reading means only when said rate exceeds a pre-set threshold value.

3. A data processing system according to claim 2 wherein said reading means is a character recognition device capable of operating on printed textual matter in at least one type font, which constitutes said one preselected form, other forms including different type fonts, graphic, and pictorial matter.

4. A data processing system according to claim 3 wherein the operating rates at said readout and said copying means are synchronized to achieve collation of the outputs thereof recorded on said preselected medium.

5. A data processing system comprising:

reading means operable to scan textual matter and to generate output signals representative of intelligence conveyed thereby in characters of at least one preselected recognizable font;

data processing means normally receiving said output signals, and operating thereon in a predetermined manner to generate output data signals conveying said intelligence in modified form;

readout means normally receiving the output data signals and recording such signals in a useable form on a selected medium;

graphic copying means operable to scan said textual matter and recording images thereof on said selected medium; and means, operative in response to scanning by said reading means of material in the textual matter which is not in said recognizable font, to disable temporarily said readout means and simultaneously enable said copying means, and operative to re-enable output of said reading means and disable said copying means in response to subsequent scanning of recognizable textual matter by said reading means.

References Cited

UNITED STATES PATENTS 3,372,568 3/1968 Lemelson.

FOREIGN PATENTS 1,007,919 8/1965 Great Britain.

THOMAS A. ROBINSON, Primary Examiner

U.S. Cl. X.R.

101—426; 178—5